United States Patent
Butscher et al.

(10) Patent No.: US 9,303,971 B1
(45) Date of Patent: Apr. 5, 2016

(54) HIGH ASPECT RATIO POSITIONING SYSTEM

(75) Inventors: Stephen T. Butscher, Huntington Beach, CA (US); Robert J. Atmur, Whittier, CA (US); Angelo Truncale, Lake Forest, CA (US); Joseph E. Justin, Corona, CA (US); Thomas C. Williams, Fresno, CA (US)

(73) Assignee: The Boeing Company, Chicago, IL (US)

( * ) Notice: Subject to any disclaimer, the term of this patent is extended or adjusted under 35 U.S.C. 154(b) by 980 days.

(21) Appl. No.: 12/968,669

(22) Filed: Dec. 15, 2010

(51) Int. Cl.
- *G01B 7/30* (2006.01)
- *G01C 19/24* (2006.01)
- *G01C 21/00* (2006.01)
- *G05D 1/00* (2006.01)

(52) U.S. Cl.
CPC . *G01B 7/30* (2013.01); *G01C 19/24* (2013.01)

(58) Field of Classification Search
CPC ........ G01C 19/30; G01C 19/44; G01C 19/38; G01C 19/28; G01C 19/20; G01C 19/08; G01C 19/24; G01C 19/18; G01C 19/00; G01C 19/42; G01C 19/16; G01C 19/06; G01C 19/04; B64G 1/286; G01B 7/30; G01B 7/003; G01D 5/22; G01D 5/2033
USPC .................. 74/5.6 B, 5.6 D, 5.6 E, 5.46, 5.47
See application file for complete search history.

(56) References Cited

U.S. PATENT DOCUMENTS

| | | | | | |
|---|---|---|---|---|---|
| 2,960,873 | A | * | 11/1960 | Lundberg | 74/5.12 |
| 3,240,050 | A | * | 3/1966 | Morsewich | 73/1.37 |
| 3,252,339 | A | * | 5/1966 | Huang | 74/5.6 D |
| 3,883,957 | A | * | 5/1975 | Youkin | 33/318 |
| 4,143,466 | A | * | 3/1979 | Quermann | 33/327 |
| 4,320,669 | A | * | 3/1982 | Grohe | 74/5.37 |
| 4,357,837 | A | * | 11/1982 | Beardmore | 74/5 F |
| 4,487,083 | A | * | 12/1984 | Quermann | 74/5.46 |
| 4,631,510 | A | * | 12/1986 | Nagarkatti et al. | 336/135 |
| 4,891,997 | A | * | 1/1990 | Hayashi | 74/5.46 |
| 5,559,417 | A | * | 9/1996 | Sears et al. | 318/689 |
| 7,508,154 | B1 | * | 3/2009 | Labriola, II | 318/602 |
| 8,729,887 | B2 | * | 5/2014 | Suzuki et al. | 324/207.16 |
| 2009/0243782 | A1 | * | 10/2009 | Fouquet et al. | 336/200 |
| 2010/0102681 | A1 | * | 4/2010 | Koga et al. | 310/68 B |

OTHER PUBLICATIONS

Website of Apollo Logistics Training, the Apollo Guidance and Navigation System located at http://www.ibiblio.org/apollo/Documents/ApolloTrainingGuidanceAndNavigation07-65.pdf. revised copy dated Jul. 1, 1965; 56 pages.

* cited by examiner

*Primary Examiner* — Ha D Ho
*Assistant Examiner* — Jude Agendia
(74) *Attorney, Agent, or Firm* — Baldauff IP, LLC; Michael J. Baldauff, Jr.

(57) ABSTRACT

High aspect ratio positioning systems are disclosed herein. A high aspect ratio positioning system can be packaged in a thin package that can eliminate some bulky components typically associated with positioning systems such as pancake motors or other motors, geared resolvers, gear trains, and the like. Thus, the high aspect ratio positioning system can be used in applications where volume is limited, without sacrificing accuracy.

40 Claims, 10 Drawing Sheets

HIGH ASPECT RATIO POSITIONING SYSTEM

TECHNICAL FIELD

The present disclosure relates generally to positioning systems and, more particularly, to high aspect ratio positioning systems.

BACKGROUND

In a variety of commercial and military applications, movement of rotating structures is tracked for various reasons. For example, data corresponding to various types of movement associated with aircraft, boats, missiles, satellites, space stations, spacecraft, submarines, and the like, may be tracked for use in calculating position or orientation of vehicles, structures, projectiles, and/or other entities.

For example, in some applications such as an aileron of an aircraft, rotation of the aileron, relative to a wing or other aircraft structure, can be measured to control and track movement of the aileron. Data corresponding to the measured movement can be used to calibrate controls, track movement of the structures, and/or for other purposes.

The measurements detected and/or tracked can be transmitted to a control system, tracking system, and/or other entities, if desired. Data corresponding to the tracked measurements can be transmitted as current and/or as other types of optical or electrical signals to control systems and/or management systems. In some embodiments, the data is used to orient or position structures, for navigating and/or correction of navigation data, or for other purposes. For example, a commercial aircraft may include a dish antenna for providing network connectivity for the aircraft. During movement of the aircraft, the dish antenna can be maintained in a stationary position relative to a transmitter, though the commercial aircraft may move or rotate.

Also, the data can be used to track movement of the structures and/or platforms to which the structures are connected. For example, many modern watercraft, aircraft, and spacecraft include an inertial measurement unit for detecting and measuring movement of the watercraft, aircraft, and/or spacecraft. In these and other applications, the size, shape, and weight of the inertial measurement units can influence performance of the vehicles and/or the inertial measurement units. Many conventional inertial measurement units are of substantial size and weight. This aspect of conventional solutions is not conducive to use in some aerospace and other applications in which space and weight are substantial considerations.

It is with respect to these and other considerations that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

According to an embodiment of the present disclosure, a high aspect ratio positioning system includes a support surface. A motor is disposed adjacent the support surface. The motor has a motor coil assembly attached to an outer magnetic layer, a commutation coil assembly, and a ring of magnets disposed adjacent an inner magnetic layer. The high aspect ratio positioning system further includes two resolvers adjacent the motor. At least one of the outer magnetic layer and the inner magnetic layer can be formed from ferritic steel or another material. The high aspect ratio positioning system also can include a gap between the motor coil assembly and the commutation coil assembly.

In some embodiments, the ring of magnets includes a ring of rare earth magnets. The ring of rare earth magnets can be arranged in a ring and attached to the inner layer. In some implementations, at least one of the two resolvers includes an inner resolver coil and an outer resolver coil. The inner resolver coil can include a coil formed from a conductive material. The coil can be encased in a flexible material. According to implementations, the conductive material includes or is copper, and the flexible material includes or is KAPTON. It should be understood that other materials in addition to, or instead of, KAPTON can be used. Thus, it will be understood that these embodiments are exemplary, and should not be construed as being limiting in any way.

In some embodiments, the outer resolver coil includes two coils formed from the conductive material and encased in a flexible material. The conductive material can be copper, aluminum, gold, silver, and/or other conductive materials, and the flexible material can include KAPTON or other materials. In some implementations, a first of the two resolvers includes a first coil having a first number of windings, and a second of the two resolvers includes a second coil having a second number of windings, the second number being one less than the first number.

In some embodiments, the support surface includes a spherical surface. The motor coil assembly and the two resolvers can be disposed proximate to a largest diameter of the support surface. In some embodiments, the largest diameter ranges from a diameter of four inches to a diameter of six inches. In other embodiments, the largest diameter ranges from a diameter of two inches to a diameter of twelve inches. In still other embodiments, the largest diameter ranges from a diameter of one inch to a diameter of twenty four inches.

According to another aspect, an inertial measurement unit includes a set of spherical gimbals. The set of spherical gimbals includes an outer sphere and an innermost sphere. The innermost sphere includes a support surface, a motor disposed adjacent the support surface, and two resolvers adjacent the motor. The motor includes a motor coil assembly attached to an outer magnetic layer, a commutation coil assembly, and a ring of magnets disposed adjacent an inner magnetic layer. The inertial measurement unit also can include a gap between the motor coil assembly and the commutation coil assembly. In some embodiments, the ring of magnets includes two or more rare earth magnets arranged in a ring and attached to the inner layer.

In some embodiments, each of the two resolvers includes an inner resolver coil and an outer resolver coil. The outer resolver coil can include two coils formed from a conductive material, and each of the two coils can be encased in a flexible material. A first of the two resolvers can include a first coil having a first number of windings, and a second of the two resolvers can include a second coil having a second number of windings. According to various embodiments, the second number is one less than the first number. In some implementations, each of the inner resolver coils and the outer resolver coils includes a coil formed from the conductive material. Each of the coils can be encased in the flexible material.

According to various implementations, the inertial measurement unit further includes an interface for communicating with a computing system in communication with the inertial measurement unit. The computing system can include an operating environment for the inertial measurement unit.

According to various embodiments, the operating environment includes a vehicle. The vehicle can include, but is not limited to, aircraft, watercraft, spacecraft, land vehicles, satellites, space stations, tanks, missiles, and other vehicles.

According to yet another aspect, a spherical gimbal set includes an outer sphere, an innermost sphere including a support surface, and a high aspect ratio positioning system disposed proximate to the support surface. The high aspect ratio positioning system can include a motor disposed adjacent the support surface. The motor can include a motor coil assembly attached to an outer magnetic layer, a commutation coil assembly, and a ring of magnets disposed adjacent an inner magnetic layer. The high aspect ratio positioning system also includes two resolvers adjacent the motor.

According to implementations, the outer sphere includes two flanges configured to connect the outer sphere to a support such that the outer sphere is allowed to rotate about a rotational axis concentric with a center of the flanges. In some embodiments, the outer sphere further includes two inner flanges configured to connect to two innermost flanges of an innermost sphere, the innermost sphere being supported by the outer sphere such that the innermost sphere is allowed to rotate about a second rotational axis. In some embodiments, the ring of magnets includes two or more rare earth magnets attached to the inner layer.

In some embodiments, a first of the two resolvers includes a first coil having a first number of windings formed from a conductive material and encased in a flexible material. Additionally, a second of the two resolvers includes a second coil having a second number of windings formed from the conductive material and encased in the flexible material. According to various embodiments, the second number is one less than the first number, i.e., if the first number is n, the second number is n−1. In some implementations, the conductive material includes copper, the flexible material includes KAPTON or other materials, and the innermost sphere is formed from aluminum.

According to still another embodiment, a vehicle includes an inertial measurement unit configured to track orientation of the vehicle. The inertial measurement unit includes a set of spherical gimbals, the innermost sphere including a support surface, a motor disposed adjacent the support surface, the motor including a motor coil assembly attached to an outer magnetic layer, a commutation coil assembly, a gap between the motor coil assembly and the commutation coil assembly, and two or more magnets arranged in a ring, the magnets being disposed adjacent an inner magnetic layer. The inertial measurement unit also can include two resolvers adjacent the motor. Each of the two resolvers can include an inner resolver coil and an outer resolver coil.

According to some embodiments, a first of the two resolvers includes a first coil having a first number of windings formed from copper and encased in KAPTON or another material. A second of the two resolvers includes a second coil having a second number of windings formed from copper and encased in the KAPTON or another material. The second number can be one less than the first number. In some embodiments, the vehicle further includes a warhead and an engine for delivering the warhead.

According to another aspect, a method for sensing movement of a structure includes receiving a data signal generated by a high aspect ratio positioning system in response to movement of the structure, determining if movement of the structure has ceased, and in response to determining that movement of the structure has not ceased, monitoring the high aspect ratio positioning system for another data signal. The high aspect ratio positioning system includes a support surface, a motor disposed adjacent the support surface, and two resolvers adjacent the motor. The motor includes a motor coil assembly attached to an outer magnetic layer, a commutation coil assembly, and a ring of magnets disposed adjacent an inner magnetic layer. In some embodiments, the data signal comprises data indicating movement of the resolvers. In some embodiments, the positioning system includes an inertial measurement unit.

The features, functions, and advantages discussed herein can be achieved independently in various embodiments of the present invention or may be combined in yet other embodiments, further details of which can be seen with reference to the following description and drawings.

DETAILED DESCRIPTION

Figure 1:
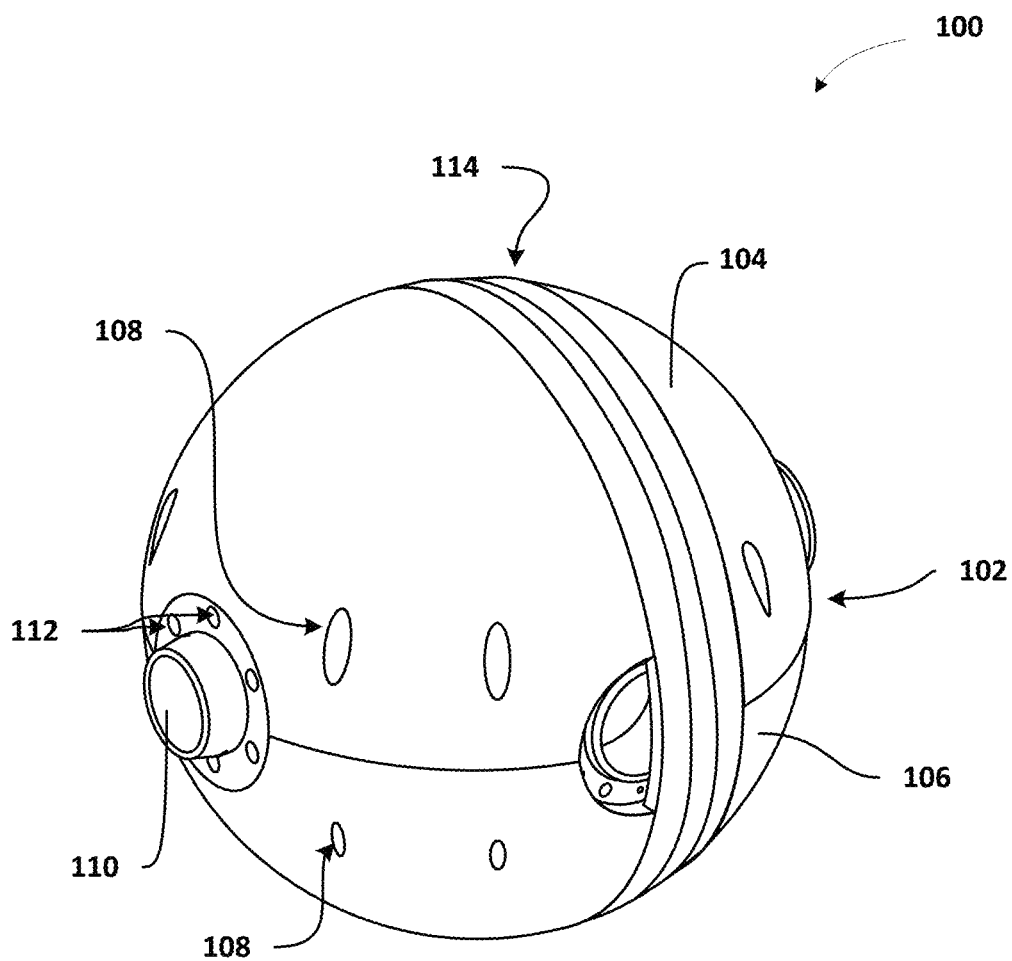
FIG. 1 is a perspective view of a thin-walled spherical gimbal set incorporating a high aspect ratio positioning system, according to an exemplary embodiment.

The following detailed description is directed to high aspect ratio positioning systems. As used herein, the phrase "aspect ratio" is used to refer to a ratio of diameter to thickness, i.e., a crossectional ratio, of positioning system structures as disclosed herein. Thus, a high aspect ratio positioning system, as disclosed herein, includes positioning systems formed from a combination of one or more motors and one or more resolvers, wherein the combination has a large diameter to thickness, i.e., crossectional, ratio relative to existing motor resolver combinations. According to the concepts and technologies disclosed herein, a high aspect ratio positioning system can be packaged in a thin package that saves space and can be used to generate and measure accurately and precisely controlled movements and/or for measuring movements accurately and precisely. The high aspect ratio positioning system can eliminate some bulky components typically associated with positioning systems such as pancake motors or other motors, geared resolvers, gear trains, and the like. Thus, the high aspect ratio positioning system can be used in applications where volume is limited, without sacrificing accuracy.

Furthermore, the high aspect ratio positioning system can provide high resolution resolving by moving resolvers and motors to largest diameters of cylindrical or spherical structures. Thus, motor torques can be reduced, gear trains and/or other intermediate structures can be eliminated from the high aspect ratio positioning system. The construction includes use of flexible substrates and conductive print patterns. These and other aspects of the concepts and technologies disclosed herein can be used to provide a cost-efficient and thin package for the high aspect ratio positioning system. Thus, as will be more fully appreciated herein, some embodiments of the concepts and technologies disclosed herein provide accuracy and resolution of the high aspect ratio positioning system that meet or exceed accuracies and resolutions associated with other positioning systems in smaller, thinner, lighter, and more cost effective packages relative to existing technologies. In some embodiments, one or more high aspect ratio positioning systems are used in gimbal sets and/or other structures. The high aspect ratio positioning systems and/or gimbal sets embodying the high aspect ratio positioning systems can be included in inertial measurement units ("IMUs"), inertial reference units ("IRUs"), inertial navigation systems ("INSs"), and/or other navigation and/or reference systems of land, sea, air, and space vehicles, as well as other devices and/or structures. These and other advantages and features will become apparent from the description of the various embodiments below.

In the following detailed description, references are made to the accompanying drawings that form a part hereof and that show, by way of illustration, specific embodiments or examples. In referring to the drawings, like numerals represent like elements throughout the several figures.

FIG. 1 schematically illustrates a thin-walled spherical gimbal set 100 incorporating a high aspect ratio positioning system, according to an exemplary embodiment. The illustrated thin-walled spherical gimbal set 100 includes an outer sphere 102. The outer sphere 102 can be gimbaled to a stationary object or support surface such as, for example, another sphere, a frame, an outer gimbal, or another surface (not illustrated).

The outer sphere 102 is configured to function in a manner substantially similar to a manner in which an inner gimbal of a traditional gimbal set functions. The outer sphere 102 can be formed from an upper portion 104 and a lower portion 106. According to various embodiments, the upper portion 104 and the lower portion 106 are formed from aluminum or other metals, plastics or other polymers, composites, other materials, combinations thereof, and the like. The materials used to form one or both of the upper portion 104 and/or the lower portion 106 can be selected based upon density, rigidity, stiffness, tensile strength, thermal capabilities, cost, combinations thereof, and the like of the material and/or a targeted weight, durability, rotational speed, strength, and/or other specifications, needs, or considerations associated with the outer sphere 102, the thin-walled gimbal set 100, and/or a structure or platform embodying or containing the outer sphere 102 and/or the thin-walled gimbal set 100.

The upper portion 104 and the lower portion 106 can be joined together to create the spherical surface of the outer sphere 102. In some embodiments, the spherical surface of the outer sphere 102 functions as a support surface, as will be explained in more detail below. In the illustrated embodiment, the upper portion 104 and the lower portion 106 are mated together with fasteners such as screws, pins, and the like, which are inserted through the access holes 108. It should be understood that this embodiment is exemplary, and should not be construed as being limiting in any way.

In FIG. 1, the upper portion 104 and the lower portion 106 are illustrated as being similar to one another. In particular, the upper portion 104 and the lower portion 106 are illustrated as being near-mirror images of one another, though the access holes 108 illustrated in the upper portion 104 and the lower portion 106 can be staggered with respect to one another. It should be understood, however, that this is not necessarily the case. More particularly, it should be understood that more than two portions can be assembled to form the outer sphere 102. Furthermore, it should be understood that the two or more portions may be distinct from one another and need not be identical or mirror images of one another.

The outer sphere 102 is configured to support two flanges 110. The flanges 110 are configured to be attached to a suitable structure to support the outer sphere 102. In some embodiments, the flanges 110 are attached to a support structure such as, for example, an outer gimbal or other surface. The flanges 110 can be formed from any suitable material or combination of materials including, but not limited to, aluminum, steel, nickel, brass, beryllium, or other metals and alloys, plastics and other polymers, ceramics, composites, combinations thereof, and the like. Although not visible in FIG. 1, the outer sphere 102 can include a number of attachment holes for connecting the flanges 110 to the outer sphere 102. Screws or other fasteners (not illustrated) can be passed through or into flange attachment holes 112 formed in the flanges 110, and attached to the attachment holes formed in the outer sphere 102. It should be understood that this embodiment is exemplary, and should not be construed as being limiting in any way.

Although not readily visible in FIG. 1, it will be understood that the outer sphere 102 can be configured to support an innermost sphere. Thus, the outer sphere 102 can be supported by a gimbal or other support surface, and can function as a gimbal for a structure located at the interior of the outer sphere 102. In the illustrated embodiment, the outer sphere includes an inner flange via which the outer sphere 102 supports an innermost sphere. It should be understood that this embodiment is exemplary, and should not be construed as being limiting in any way. The innermost sphere and the inner flange are illustrated and described below with reference to FIG. 2.

According to various embodiments, the thin-walled spherical gimbal set 100 is used to support a high aspect ratio positioning system 114. The high aspect ratio positioning system 114 is used to provide electrical output corresponding to rotational movements associated with the outer sphere 102. More particularly, as will be explained in more detail with reference to FIGS. 2-6, movement of the outer sphere 102 can cause a corresponding movement of the high aspect ratio positioning system 114, which can be measured using suitable computing devices including, but not limited to, computing systems or a combination of hardware and software components. In some embodiments, the computing systems include or are part of an avionics system of an aircraft. It should be understood that this embodiment is exemplary, and should not be construed as being limiting in any way. Additional aspects of the high aspect ratio positioning system 114 are illustrated and described with reference to FIGS. 2-6.

Figure 2:
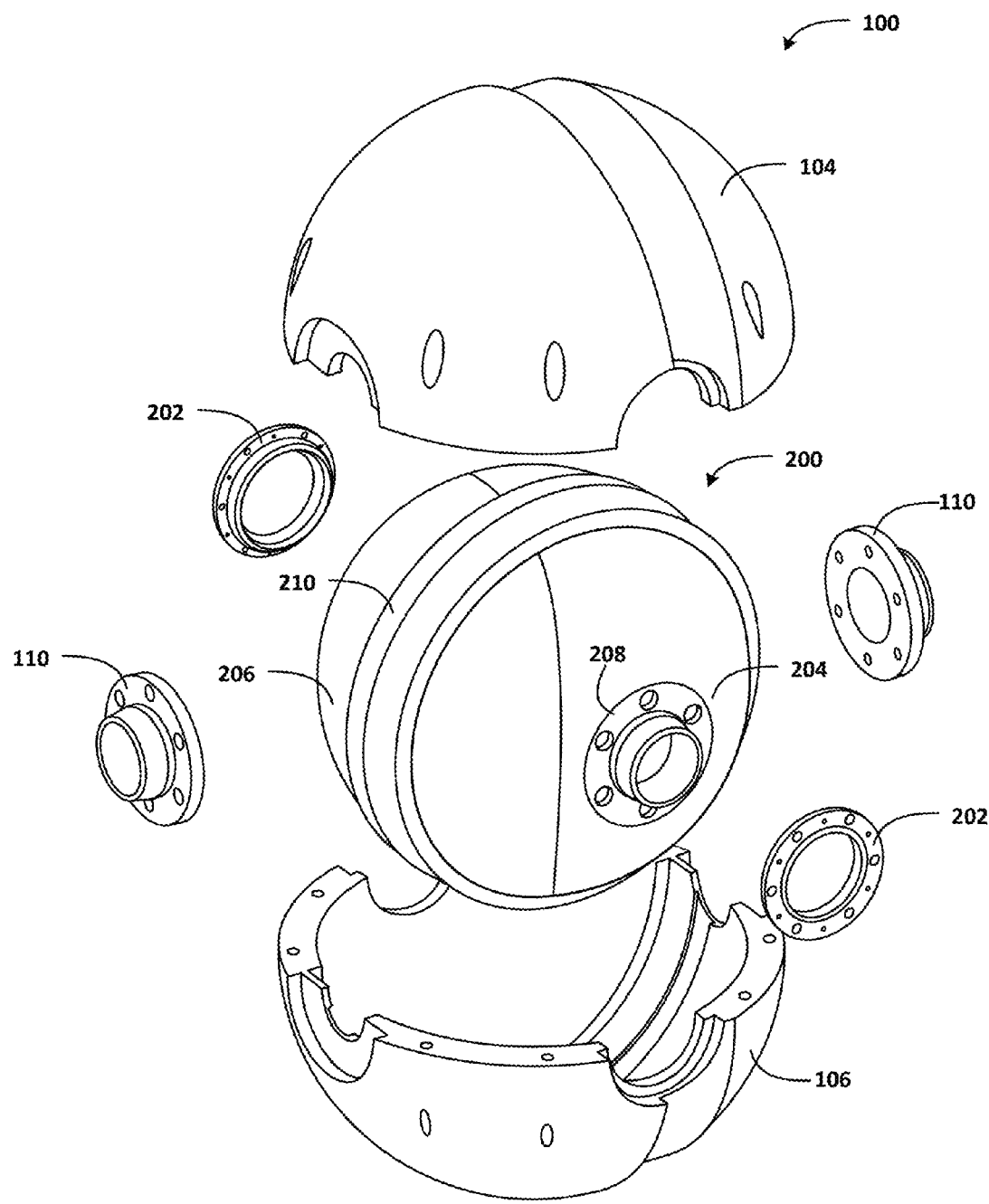
FIG. 2 is an assembly drawing illustrating aspects of the thin-walled spherical gimbal set of FIG. 1, according to an exemplary embodiment.

Turning now to FIG. 2, additional aspects of the thin-walled spherical gimbal set 100 are illustrated, according to an exemplary embodiment. As discussed above with reference to FIG. 1, an innermost sphere 200 can be disposed within the outer sphere 102. Additionally, the inner flanges described above with reference to FIG. 1 are visible in FIG. 2 and are labeled with reference numeral 202. The inner flanges 202 and the functions performed by the inner flanges 202 are described in more detail below. While not described herein, it should be understood that the flanges 110 and the inner flanges 202 can mate with and/or cooperate with various structures. For example, in some embodiments, the flanges 110 and the inner flanges 202 are joined by a bearing set such as an angular contact duplex ball bearing, or other structures. It should be understood that this embodiment is exemplary, and should not be construed as being limiting in any way.

The innermost sphere 200 can include a first portion 204 and a second portion 206, which can cooperate to form the innermost sphere 200. The innermost sphere 200 is illustrated as having a spherical surface. The spherical surface 200 can function as a support surface for various components of a high aspect ratio positioning system as disclosed herein. The innermost sphere 200 also can include two innermost flanges 208 (only one of which is visible in the view illustrated in FIG. 2). The innermost flanges 208 can be, but are not necessarily, similar or identical to the flanges 110 illustrated and described above with reference to FIG. 1.

The innermost flanges 208 can be fastened to the innermost sphere 200 in any appropriate manner including, but not limited to, the manner discussed above with regard to fastening the flanges 110 to the outer sphere 102. The innermost flanges 208 are configured to cooperate with the inner flanges 202 to provide the innermost sphere 200 with a gimbaled connection to the outer sphere 102. Thus, it will be appreciated that the innermost sphere 200, the outer sphere 102, and a support surface (not illustrated in the FIGURES) can be assembled to provide functionality associated with a gyroscope. More particularly, the flanges 110 can be used to provide a first axis of rotation, and the innermost flanges 208 can be used to provide a second axis of rotation.

The innermost sphere 200 also can include a high aspect ratio positioning system 210, which can be substantially similar, or even identical, to the high aspect ratio positioning system 114 illustrated in FIG. 1. In the illustrated embodiment, the high aspect ratio positioning system 210 has a diameter that is slightly smaller than the high aspect ratio positioning system 114. It should be understood that this embodiment is exemplary, and should not be construed as being limiting in any way. Additional features of the high aspect ratio positioning system 210 are described in more detail below. In the remainder of the disclosure, the high aspect ratio positioning system is referred to with reference numeral 210. As mentioned above, the high aspect ratio positioning system 210 and the high aspect ratio positioning system 114 can be substantially similar, and can both be used to track positioning, orientation, and/or movement of various structures and/or platforms containing or joined to the structures. Thus, it should be understood that the embodiments disclosed herein are exemplary of high aspect ratio positioning systems, and should not be construed as being limited to the high aspect ratio positioning system 210 in any way.

Figure 3:
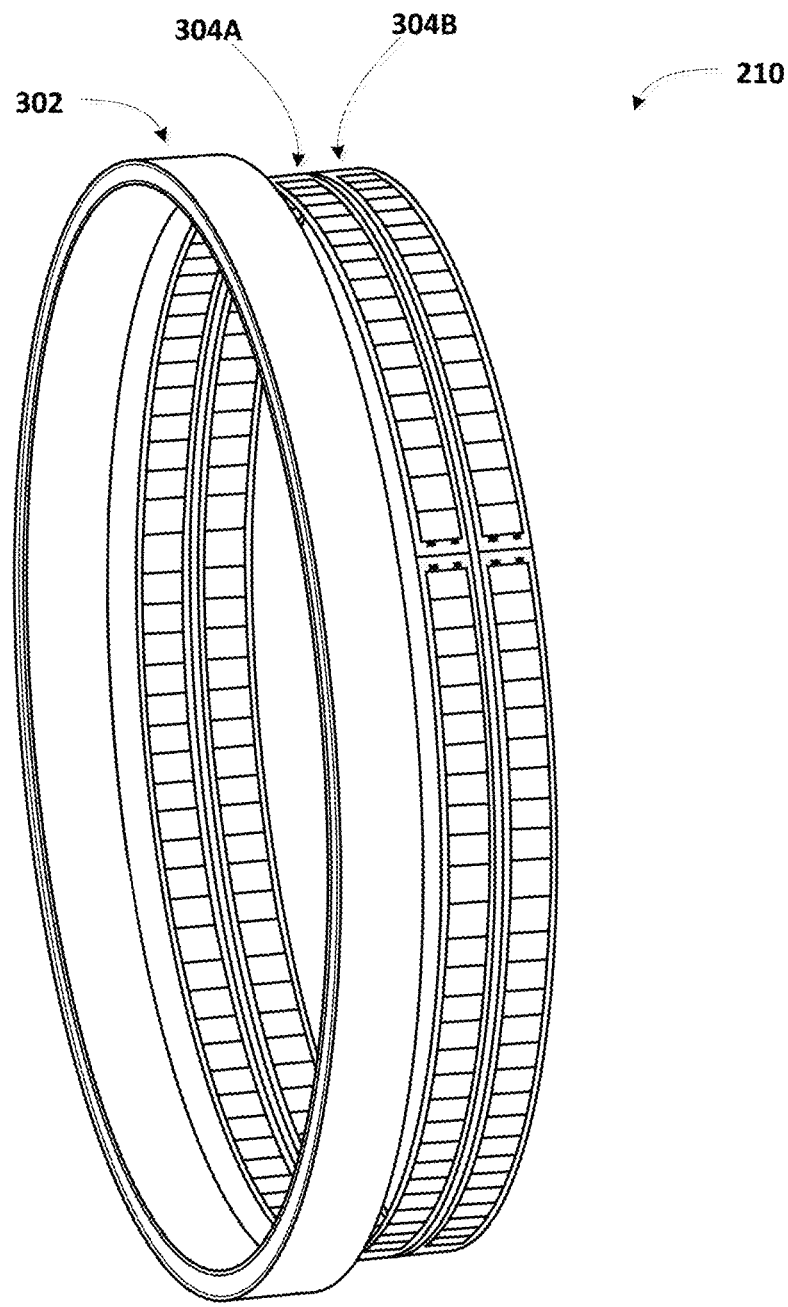
FIG. 3 is a perspective view of a motor and resolver set, according to an exemplary embodiment.

Turning now to FIG. 3, additional aspects of the high aspect ratio positioning system 210 are described in detail, according to an exemplary embodiment. The high aspect ratio positioning system 210 includes a motor 302 and two resolvers 304A, 304B, collectively referred to herein as resolvers 304. The motor 302 and the resolvers 304 can be used to accurately rotate a structure to a desired position at a desired rate. The motor 302 and the resolvers 304 also can be used to detect movement of a vehicle, a platform, or the like, to detect or track orientation or movement information, and/or for other purposes. The motor 302 and the resolvers 304 are illustrated and described in more detail below.

Figure 4:
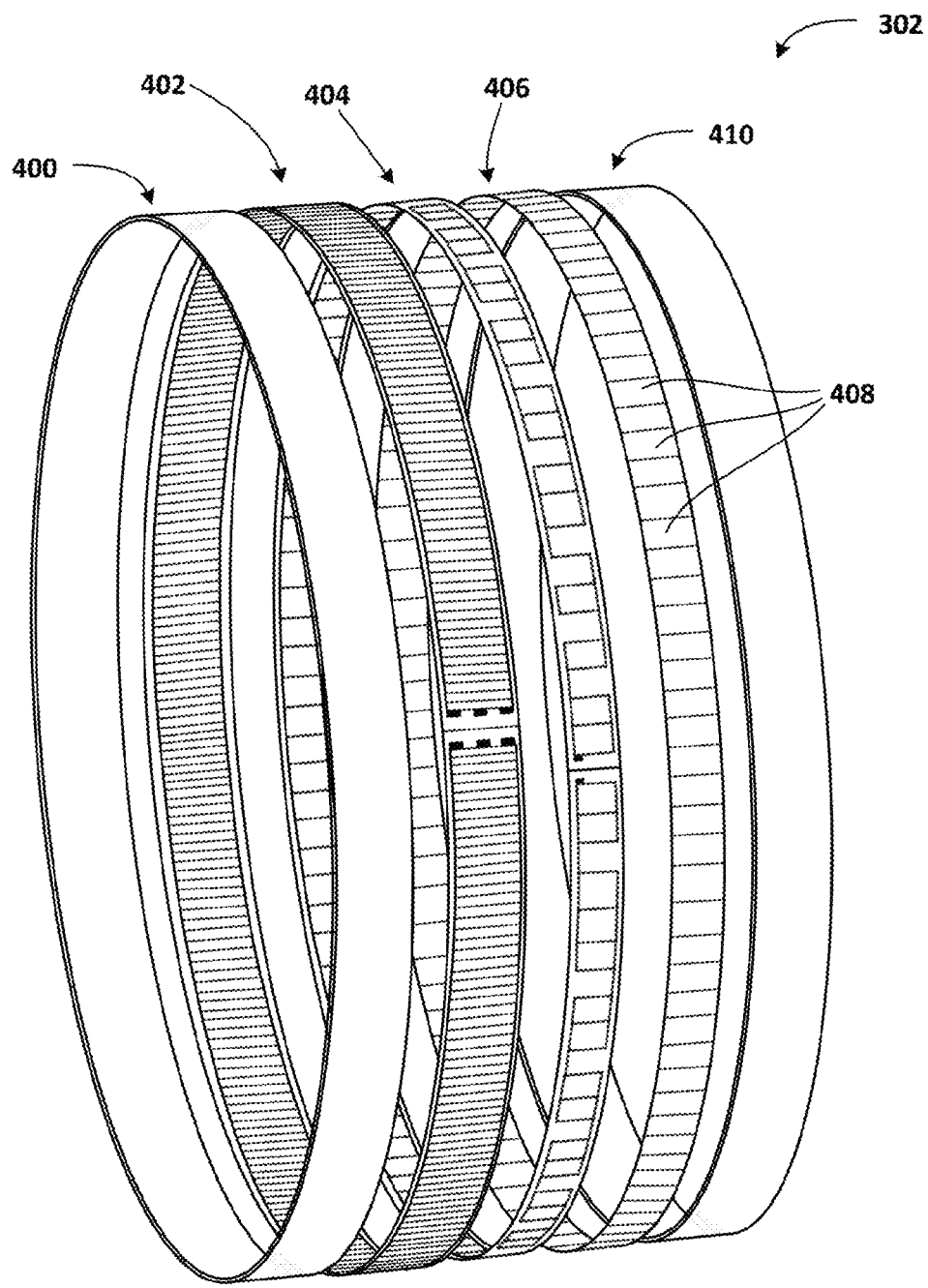
FIG. 4 is an assembly drawing illustrating additional aspects of the motor illustrated in FIG. 3, according to an exemplary embodiment.

Turning now to FIG. 4, additional aspects of the motor 302 are illustrated and described in detail. More particularly, FIG. 4 illustrates an assembly drawing of the motor 302, according to an exemplary embodiment. The exemplary motor 302 includes an outer layer 400, which can be formed from a variety of materials. According to various embodiments, the outer layer 400 is formed from one or more or a combination of magnetic materials such as, for example, iron, nickel, cobalt, or other metals, steel or other alloys, some alloys of rare earth metals, some minerals such as lodestone, other materials, combinations thereof, and the like. In the illustrated embodiment, the outer layer 400 is formed from a thin sheet of ferritic steel. It should be understood that this embodiment is exemplary, and should not be construed as being limiting in any way.

A motor coil outer assembly 402 is attached to the outer layer 400. In some embodiments, the motor coil outer assembly 402 is an assembly of three phase motor coils. According to various implementations, the motor coil outer assembly 402 is formed, at least partially, from flexible materials. More particularly, in various embodiments, the motor coils are printed circuits formed from a suitable conductive material such as, for example, copper, aluminum, and the like. Furthermore, the motor coils can be encapsulated in KAPTON or another substrates, if desired. It should be understood that this embodiment is exemplary, and should not be construed as being limiting in any way.

The motor 302 also includes, in various implementations, a commutation coil assembly 404. In the illustrated implementation, a gap is provided between the commutation coil assembly 404 and the motor coil outer assembly 402. According to various implementations, air, liquids, gases, and/or other fluids are disposed in the gap. The fluid can be selected on the basis of density, thermal properties, dielectric properties, viscosity, and/or other considerations. The dimensions of the gap can be determined based upon materials, tolerances, tooling, specifications, limitations, performance requirements, and/or other considerations associated with the motor 302 and/or components thereof. The commutation coil assembly 404 can include a printed commutation circuit formed from a conductive material such as copper, aluminum, other conductors, and the like. The printed commutation circuit can be encapsulated in KAPTON or another substrate, if desired. It should be understood that this embodiment is exemplary, and should not be construed as being limiting in any way.

The commutation coil assembly 404 can allow elimination of a resolver, which otherwise may be required to determine a commutation angle associated with the motor. Thus, the motor 302 is self-commutating. As such, the motor 302 determines not only its electrical position, but also its absolute position via the commutation coil assembly 404. Thus, the commutation coil assembly 404 is used to generate a signal for directly commutating the motor 302 without requiring demodulation or use of other structures. It should be understood that this embodiment is exemplary, and should not be construed as being limiting in any way.

The motor 302 also includes a ring 406 of magnets 408. According to various implementations, the commutation coil assembly 404 is attached to the ring 406 of magnets 408. It should be understood that this embodiment is exemplary, and should not be construed as being limiting in any way. In the illustrated embodiment, the magnets 408 are rare earth magnets that are sized and dimensioned to form the ring 406 of magnets 408. While the magnets 408 are illustrated in FIG. 4 as being shaped as flat squares or rectangles, it should be understood that other shapes are possible and are contemplated. For example, in some embodiments, the magnets 408 are contoured and/or conformed to for various other shapes. It should be understood that the ring 406 of magnets 408 are not necessarily joined to one another or to a substrate of any kind.

Thus, the magnets 408 can be arranged to form the ring 406, wherein the ring 406 refers to the orientation of the magnets 408.

According to various implementations, the ring 406 of magnets 408 are attached on one side to the commutation coil assembly 404, and on a second side to an inner layer 410. The inner layer 410 can be formed from a magnetic material including, but not limited to, those mentioned above with regard to the outer layer 400. In the illustrated embodiment, the inner layer 410 is formed from a thin sheet of ferritic steel and is substantially similar to the outer layer 400, though the inner layer 410 is dimensioned to match the inside diameter of the motor 302 instead of the outer diameter of the motor 302 as is the case for the outer layer 400. It should be understood that this embodiment is exemplary, and should not be construed as being limiting in any way. Other materials can be used for the inner layer 410, and it should be understood that the material of the outer layer 400 and the inner layer 410 can be, but are not necessarily, the same.

As mentioned above, the dimensions of the various components of the high aspect ratio positioning system 210 can vary widely depending upon the particular application in which the high aspect ratio positioning system 210 is used. Thus, the following exemplary dimensions should be understood as being illustrative, and should not be construed as being limiting in any way. The following exemplary dimensions are provided to provide further detail regarding the concepts and technologies disclosed herein, and not for any limiting purpose.

In one implementation, the high aspect ratio positioning system 210 has an inner motor diameter of six and four tenths inches (6.4"). In this embodiment, the outer layer 400 of the motor 302 can be formed with a thickness of 25 thousandths of an inch (0.025"). It should be understood that this embodiment is exemplary, and should not be construed as being limiting in any way. More particularly, the outer layer 400 can be formed from material with a thickness greater or lesser than that described above, if desired.

In the above embodiment, the motor coil outer assembly 402 can be formed as a flexible assembly with a thickness of two hundredths of an inch (0.02"). It should be understood that this embodiment is exemplary, and should not be construed as being limiting in any way. More particularly, the motor coil outer assembly 402 can be formed as an assembly with a thickness greater or lesser than that described above, if desired.

In the above embodiment, the gap between the motor coil outer assembly 402 and the commutation coil assembly 404 can be less than two hundredths of an inch (<0.02") thick. It should be understood that this embodiment is exemplary, and should not be construed as being limiting in any way. More particularly, the gap between the motor coil outer assembly 402 and the commutation coil assembly 404 can be supplemented or replaced, or configured with a thickness greater or lesser than that described above, if desired.

In the above embodiment, the commutation coil assembly 404 has a thickness of seven thousandths of an inch (0.007"). It should be understood that this embodiment is exemplary, and should not be construed as being limiting in any way. More particularly, the commutating assembly 404 can be formed with a thickness greater or lesser than that described above, if desired.

In the above embodiment, the magnets 408 have a thickness of about sixty two and a half thousandths of an inch (0.0625"). It should be understood that this embodiment is exemplary, and should not be construed as being limiting in any way. More particularly, the magnets 408 can be formed with a thickness greater or lesser than that described above, if desired.

In the above embodiment, the inner layer 410 is formed with a thickness of about twenty five thousandths of an inch (0.025"). It should be understood that this embodiment is exemplary, and should not be construed as being limiting in any way. More particularly, the inner layer 410 can be formed from material with a thickness greater or lesser than that described above, if desired. Furthermore, while the thicknesses set forth above with regard to the outer layer 400 and the inner layer 410 are identical, it should be understood that this is not necessarily the case.

Thus, in the above-described example, the entire motor 302 has a thickness of less than sixteen hundredths of an inch (0.160"), but provides a motor inner dimension of nearly six and a half inches (6.4"). It will be appreciated that the thickness of the motor 302 relative to the motor inner dimension is extremely thin, compared to existing technologies. Thus, it will be appreciated that the concepts and technologies disclosed herein allow for reduction of overall package size and weight associated with the high aspect ratio positioning system 210. In some embodiments, the innermost sphere 200 functions as a support surface for providing rigidity for the motor 302, as the motor 302 can be formed, at least partially, from flexible components and/or materials.

The above description of FIG. 4 illustrates the outer layer 400 and the inner layer 410 as two layers of ferritic steel. In some embodiments, however, the outer layer 400 and the inner layer 410 are integrated into support structures, and the support structures are formed from ferritic steel. Thus, the illustrated embodiment should not be construed as being limiting in any way.

Figure 5:
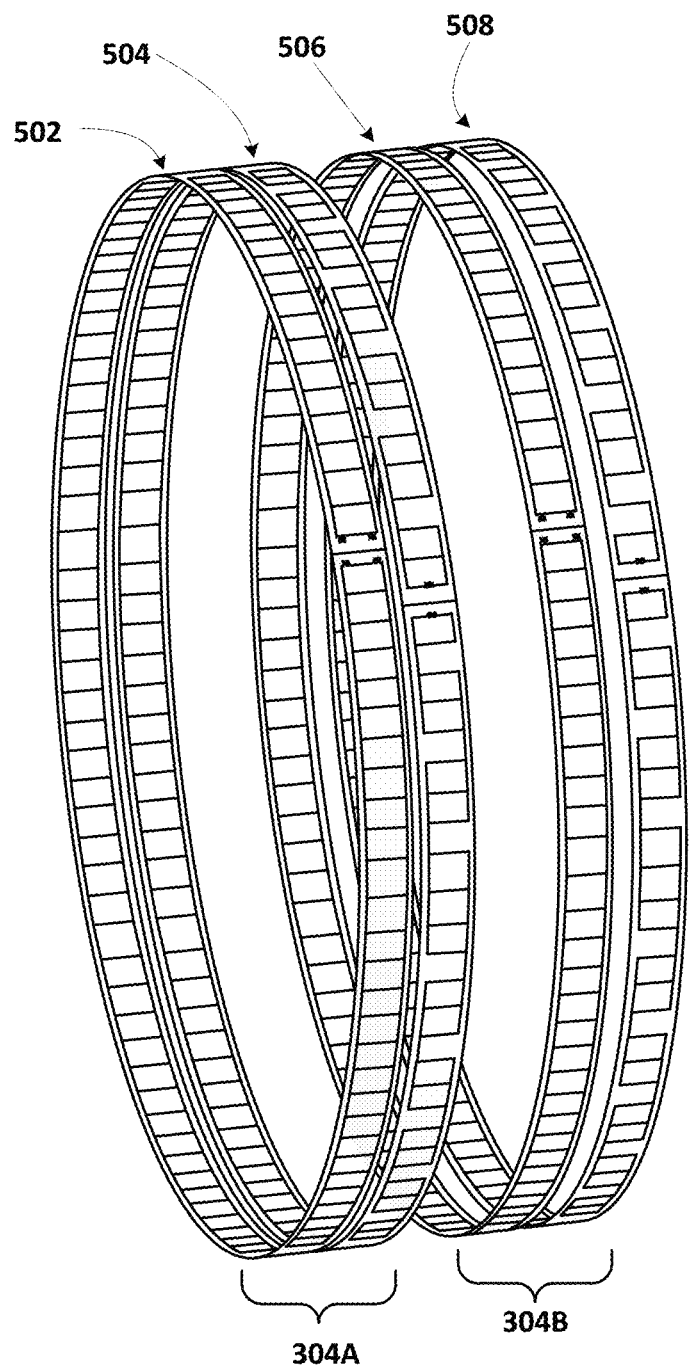
FIG. 5 is an assembly drawing illustrating additional aspects of the resolvers illustrated in FIG. 3, according to an exemplary embodiment.

Turning now to FIG. 5, additional details of the resolvers 304 are described in detail, according to an exemplary embodiment. According to various embodiments, the resolver 304A is formed from an outer resolver coil 502 and an inner resolver coil 504. Similarly, the resolver 304B is formed, in some embodiments, from an outer resolver coil 506 and an inner resolver coil 508.

According to one embodiment, each of the outer resolver coils 502, 506 includes two coils. In some embodiments, the coils are formed from copper or another suitable conductive material. The coils can be encased in a flexible material such as KAPTON or other flexible materials. The coils can be mounted directly to a rotating structure, if desired. In some embodiments, the inner resolver coils 504, 508 include one coil. The coil of the inner resolver coils 504, 508 also can be formed from a suitable conductive material such as copper or another material, and can be encased in a flexible material such as KAPTON or other flexible materials. The coil can be mounted to the rotating structure, if desired.

According to various embodiments, the resolvers 304A, 304B are substantially similar, or even identical, to one another, though the resolver 304B may have one less winding than the resolver 304A. As such, if the resolver 304A has n windings, the resolver 304B can be configured with n−1 windings. Furthermore, according to various embodiments, the resolvers 304A, 304B are rotated ninety electrical degrees (90°) with respect to one another, as will be understood to one skilled in the art. It should be understood that this embodiment is exemplary, and should not be construed as being limiting in any way.

As the resolvers 304 are rotated with respect to the motor 302, the orientation of the windings, represented as printed circuit patterns encapsulated in KAPTON, of the outer coils 502, 506 and inner coils 504, 508 are sensed and/or used to generate a current. The current is monitored and interpreted by software and/or hardware modules to determine, based upon the current and/or other signals, the orientation of the structure to which the resolvers 304 are attached. Thus, in the embodiment illustrated in FIG. 2, for example, the orientation of the innermost sphere 200 can be determined by monitoring a current generated by movement of the resolvers 304 associated with high aspect ratio positioning system 210. It should be understood that in some embodiments such as the thin-walled gimbal set 100 illustrated and described in FIG. 1, that a number of currents associated with a number of high aspect ratio positioning systems 210 can be tracked at any particular time for any particular structure or platform.

Figure 6:
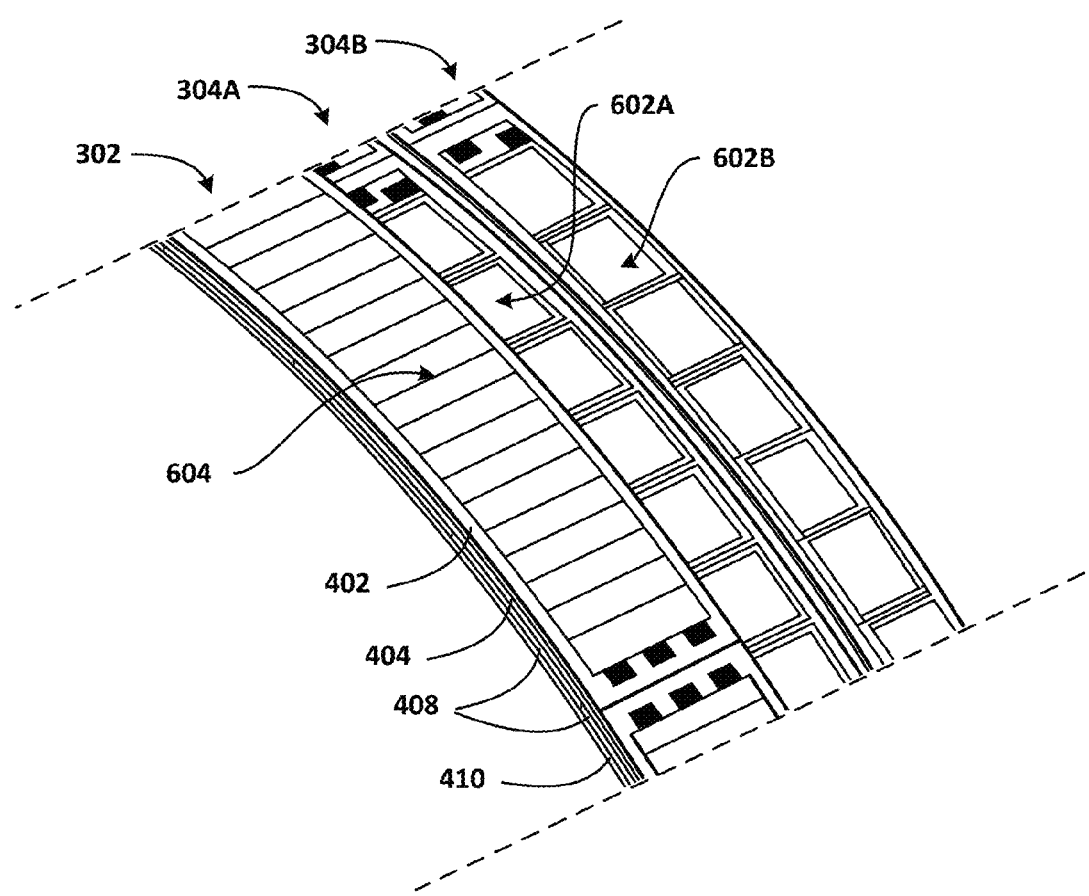
FIG. 6 is an enlarged view of the motor and resolver set illustrated in FIG. 3, according to an exemplary embodiment.

Turning now to FIG. 6, an enlarged view depicting the motor 302 and the resolvers 304 is illustrated, according to an exemplary embodiment. In FIG. 6, the windings of the outer resolver coils 502, 506 are visible. As illustrated in FIG. 6, the coils are provided by a printed circuit pattern 602A, 602B on the outer resolver coils 502, 506, respectively. As explained above, the printed circuit pattern can be formed in copper or another conductive material. The printed circuit pattern can be encapsulated in KAPTON or another suitable substrate. As mentioned above, the resolvers 304 can be formed as flexible structures, if desired.

In FIG. 6, the outer layer 400 of the motor 302 is not illustrated. As such, the motor coil 402 of the motor is visible in FIG. 6. It should be understood that this embodiment is exemplary, and should not be construed as being limiting in any way. A coil 604 is visible on the exposed portion of the motor 302. It should be understood that the coil 604 also can be provided by a printed circuit pattern on the motor coil 402. As explained above, the printed circuit pattern can be formed from copper, aluminum, and/or other conductive materials. The printed circuit pattern can be encapsulated in KAPTON or another suitable substrate.

According to various embodiments, the high aspect ratio positioning system 210 allows accurate positioning of structures. In particular, various implementations of the high aspect ratio positioning system 210 allow positioning of structures with thin walls, large ratios of surface area to volume, spherical structures, and the like. In the case of the spherical gimbal set disclosed herein in FIGS. 1-2, embodiments of the concepts and technologies disclosed herein allow positioning of the high aspect ratio positioning system 210 at or near a largest diameter of a spherical structure. As such, a motor associated with the high aspect ratio positioning system 210 can be moved to or near the largest diameter of the spherical structure, and motors at or near the fulcrum or rotational axes of the spherical structures can be eliminated.

According to some implementations, the ability to move motors from rotational axes of spherical structures to or near the largest diameter of the spherical structures can allow for elimination of space-consuming motors, gears, and other structures at or near the rotational axes of the spherical surfaces. More particularly, mechanizing rotational structures has been accomplished in the past by incorporating various types of motors, resolvers, and other structures that require significant amounts of space to provide torque and resolution suitable for positioning the structures. In some embodiments, for example, gimbal sets employ pancake motors and geared resolver assemblies to achieve desired levels of motion and resolution.

Pancake motors, while suitable for their intended purposes, may add considerable thickness to gimbal sets. Similarly, geared resolvers and/or resolver gear trains can produce drag. Overcoming drag introduced by resolver gear trains can require additional motor power which, in turn, can require further inflation of package size and reduction of platform self-stabilizing via inertia. By moving motors from the fulcrum or rotational axis to the outer diameter of the rotating structure, a greater motor circumference is realized. In some embodiments, the larger motor circumference allows for an increase in motor torques and for decrease in power requirements, and improved resolver resolutions without increasing space usage. Furthermore, in some implementations, bulky gear trains can be eliminated, thus reducing or eliminating gear-train-induced drag and efforts aimed at remedying the drag such as introducing gear trains, increasing the motor torque, and the like, as explained above.

According to various implementations, elimination of gears and/or gear trains also can allow gear-related problems to be reduced and/or eliminated. For example, the use of gears in positioning systems can introduce sources for wear, failure, debris generation, and the like. Thus, by eliminating gears, these sources of wear, debris generation, failure, and the like, can be eliminated. Furthermore, by eliminating gears, the need to identify suitable lubricants and the need to use suitable lubricants in the positioning systems can similarly be eliminated. Other benefits can be realized by eliminating gears and/or other moving parts from positioning systems, and will not be described herein in additional detail.

While large diameter motors and resolvers exist, packaging limitations make incorporation of these motors and resolvers impractical and/or impossible in some applications. More particularly, the large diameter motors and resolvers are comparatively thick, relative to the motors and resolvers disclosed herein. Thus, embodiments of the concepts and technologies disclosed herein allow packaging of the high aspect ratio positioning system 210 in small packages and are particularly advantageous in thin-walled cylindrical and spherical surfaces where space limitations may be most pronounced.

According to embodiments, the size of the high aspect ratio positioning system 210 is scalable to any size, limited only by mechanical, material, and manufacturing limitations. Embodiments incorporating the high aspect ratio positioning system 210 disclosed herein range from outside diameters of about one and a half inches (1.5") to around twenty four inches (24"). Above about twenty four inches, the concepts and technologies disclosed herein may continue to function correctly and efficiently, but more practical and/or cost-efficient alternatives may exist. Such alternatives may be substituted for the high aspect ratio positioning system 210 disclosed herein, if desired.

Similarly, for diameters less than about one and half inches, the concepts and technologies disclosed herein may continue to function correctly and efficiently, but more practical and cost-efficient alternatives may exist. Such alternatives may be substituted for the high aspect ratio positioning system 210 disclosed herein. According to various implementations, embodiments of the high aspect ratio positioning system 210 provide a cost effective, compact, and accurate alternative to existing positioning technologies for structures ranging from about four to about six inches (~4-6"). According to other implementations, embodiments of the high aspect ratio positioning system 210 provide a cost effective, compact, and accurate alternative to existing positioning technologies for structures ranging from about two inches diameter to about twelve inches in diameter. It should be understood that these embodiments are exemplary, and should not be construed as being limiting in any way.

In some embodiments, the high aspect ratio positioning system 210 disclosed herein is optimized or designed for particular maximum rotational speeds. In some embodiments, errors begin to occur for rotational speeds above about one hundred rotations per minute. Thus, in some embodiments, the high aspect ratio positioning system 210 is optimized for measuring rotational movements occurring between zero rotations per minute and one hundred rotations per minute. It should be understood that this embodiment is exemplary, and should not be construed as being limiting in any way.

Figure 7:
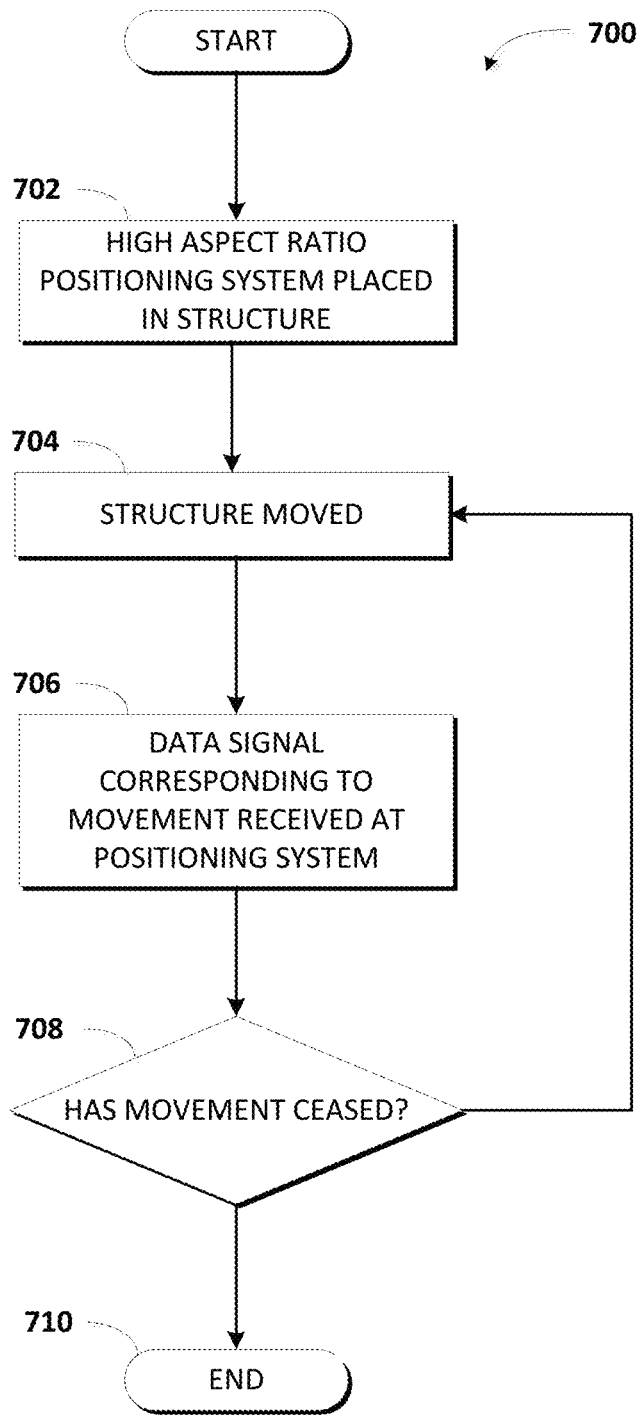
FIG. 7 is a flow diagram illustrating aspects of a method for determining position of a structure, according to an exemplary embodiment.

Turning now to FIG. 7, aspects of a method 700 for determining position of a structure will be described in detail. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods described herein, and/or substantially equivalent operations, can be performed by execution of computer-readable instructions included on a computer-storage media, as defined above. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. In some embodiments, the computer-readable instructions are executed by computing systems or a combination of hardware and software components. In some embodiments, the computing system includes or is a component of an avionics system of an aircraft or spacecraft. It should be understood that this embodiment is exemplary, and should not be construed as being limiting in any way.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The method 700 begins at operation 702, wherein a high aspect ratio positioning system 210 is placed into a structure or a component thereof. The structure can include, according to various embodiments, an airplane, a spacecraft, a watercraft, a tank or other land vehicle, a robot, a joint, a satellite, a space station, other structures, and/or components thereof. Some exemplary structures are set forth below with regard to FIGS. 8A-8G. It should be understood that these embodiments are exemplary, and that positioning and/or orientation information can be tracked for almost any structure.

From operation 702, the method 700 proceeds to operation 704, wherein the structure or a component thereof is moved. In the case of a structure such as a vehicle, the vehicle can be moved. In case of a component of the structure, for example a joint of two members of a robotic device, the two members can be rotated about the joint or the joint may be moved. In these and other embodiments, the high aspect ratio positioning system 210 can be used to monitor movement of the structure or the structure component.

From operation 704, the method 700 proceeds to operation 706, wherein a data signal generated by the high aspect ratio positioning system 210 is received at a positioning system. As explained above, the data signal can include, but is not limited to, an electrical or optical signal. The data signal can be transmitted to or detected by the positioning system. In some embodiments, the positioning system includes an inertial measurement unit or another suitable device. In some embodiments, the data signal is received by the positioning system, and positioning system software executed by the positioning system interprets the data signal to detect movement of the structure.

According to various embodiments, the data signal output by the high aspect ratio positioning system 210 includes analog signals. In some implementations, the positioning system is configured to perform various operations on analog signals. In other implementations, the positioning system is configured to perform operations on digital signals. As such, the analog signals generated by the high aspect ratio positioning system 210 can be converted to digital signals, if desired, using suitable and known methods and hardware. According to other implementations, analog signals generated by the high aspect ratio positioning system 210 can be fed to analog devices and/or used for other purposes without any conversion. One embodiment of an exemplary positioning system or other device configured to interpret the data signal is illustrated and described below with reference to FIG. 9.

From operation 706, the method 700 proceeds to operation 708, wherein the positioning system determines if movement of the structure has ceased. If the positioning system determines that movement of the structure has not ceased, the method 700 returns to operation 704, and movement of the structure is monitored. It should be understood that operations 704-708 can be iterated any number of times, with the data signals representing movement of the structure being received and interpreted by a positioning system when the structure is moved. If the positioning system determines in operation 708 that movement of the structure has ceased, then in response to determining that the movement of the structure has ceased, the method 700 proceeds to operation 710. The method 700 ends at operation 710.

Figure 8A:
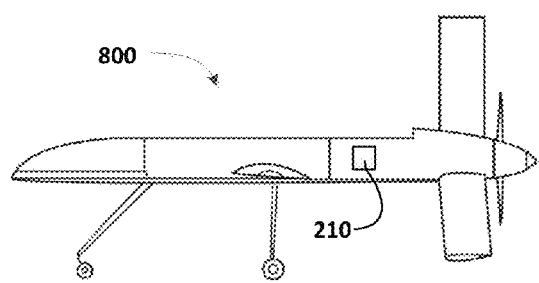
FIGS. 8A-8G illustrate exemplary operating environments for high aspect ratio positioning systems, according to exemplary embodiments.

Turning now to FIGS. 8A-8G, exemplary operating environments for the high aspect ratio positioning system 210 disclosed herein will be described. It should be understood that the placement of the high aspect ratio positioning system 210 in the drawings is exemplary, and should not be construed as being limiting in any way. FIG. 8A illustrates an exemplary unmanned aerial vehicle 800, according to an exemplary embodiment. It should be understood that the illustrated unmanned aerial vehicle 800 is exemplary, and should not be construed as being limiting in any way.

As generally is known, unmanned aerial vehicles such as the unmanned aerial vehicle 800 are flown remotely based upon remotely monitored measurements and collected data such as gauge readings and video. Thus, accurately determining the position and orientation of the unmanned aerial vehicle 800 is vital to operating the unmanned aerial vehicle 800 safely and effectively. According to various implementations, embodiments of the high aspect ratio positioning system 210 disclosed herein may be incorporated in the unmanned aerial vehicle 800 to control positioning of various structures. Exemplary structures include, but are not limited to, steerable antennas, landing gear, slats, spoilers, ailerons, flaps, elevators, rudders, cameras, weapons systems, pointing and aiming systems, sensors, other structures, and the like.

Additionally, or alternatively, one or more embodiments of the high aspect ratio positioning system 210 disclosed herein may be incorporated into an inertial measurement unit associated with the unmanned aerial vehicle 800. Thus, output associated with one or more high aspect ratio positioning systems 210 can be used to monitor positioning and orientation of the unmanned aerial vehicle 800, to correct for inaccuracies in other navigation equipment, and/or for other purposes.

Figure 8B:
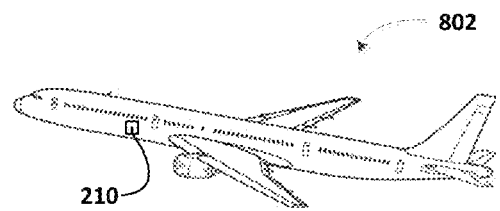

FIG. 8B illustrates a passenger airplane 802, according to an exemplary embodiment. It should be understood that the illustrated passenger airplane 802 is exemplary, and should not be construed as being limiting in any way. The passenger airplane 802 includes various structures for which accurate positioning is desired. Embodiments of the high aspect ratio positioning system 210 disclosed herein can be used to control or detect position associated with some, none, or all of the structures. Exemplary structures include, but are not limited to, ailerons, elevators, flaps, landing gear, antennas, rudders, slats, spoilers, other structures, and the like. Additionally, or alternatively, one or more embodiments of the high aspect ratio positioning system 210 disclosed herein may be incorporated into an inertial measurement unit associated with the passenger airplane 802. Thus, output associated with one or more high aspect ratio positioning systems 210 can be used to monitor positioning and orientation of the passenger airplane 802. While the passenger airplane 802 illustrated in FIG. 8B resembles a commercial passenger aircraft, it should be understood that the high aspect ratio positioning system 210 can be incorporated into military aircraft and/or private aircraft in addition to, or instead of, commercial passenger aircraft.

Figure 8C:
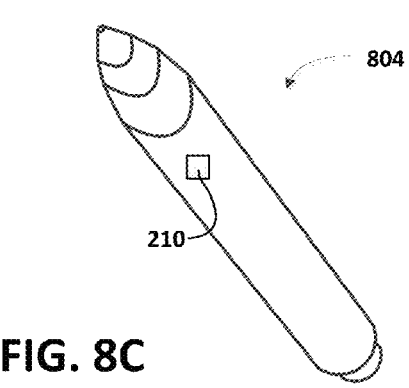

FIG. 8C illustrates a rocket 804, according to an exemplary embodiment. It should be understood that the illustrated rocket 804 is exemplary, and should not be construed as being limiting in any way. After launch of the rocket 804, positioning and orientation data associated with the rocket 804 can be collected, and output from position and orientation sensors can be used to drive aiming jet nozzles that stabilize and/or adjust the aim, orientation, trajectory, and/or position of the rocket 804. According to implementations, embodiments of the high aspect ratio positioning system 210 disclosed herein are employed in the rocket 804 to control orientation of the jet nozzles, fins, and/or other structures of the rocket 804. Additionally, or alternatively, one or more embodiments of the high aspect ratio positioning system 210 disclosed herein may be incorporated into an inertial measurement unit associated with the rocket 804. Thus, output associated with one or more high aspect ratio positioning systems 210 can be used to monitor positioning and orientation of the rocket 804.

Figure 8D:
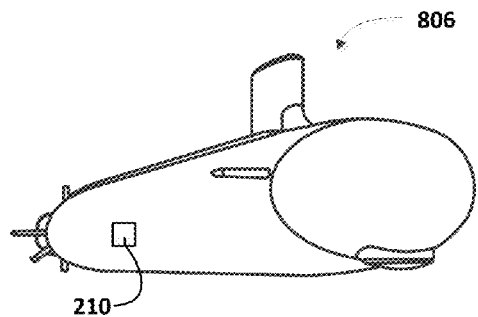

FIG. 8D illustrates a submarine 806, according to an exemplary embodiment. It should be understood that the illustrated submarine 806 is exemplary, and should not be construed as being limiting in any way. The submarine 806 includes various structures for which accurate positioning may be desired. Exemplary structures include, but are not limited to, rudders, diving planes, torpedo and missile tubes, and the like. According to implementations, embodiments of the high aspect ratio positioning system 210 disclosed herein are employed in the submarine 806 to control positioning of these and/or other structures. Additionally, or alternatively, one or more embodiments of the high aspect ratio positioning system 210 disclosed herein may be incorporated into an inertial measurement unit associated with the submarine 806. Thus, output associated with one or more high aspect ratio positioning systems 210 can be used to monitor positioning and orientation of the submarine 806.

While FIG. 8D illustrates a submarine 806, it should be understood that embodiments of the high aspect ratio positioning system 210 can be used in other watercraft in addition to, or instead of, the submarine 806. For example, embodiments of the high aspect ratio positioning system 210 can be embodied in submersible watercraft as well as other types of watercraft such as boats, ships, hydrofoils, underwater robots, other watercraft, and the like. Thus, it should be understood that the embodiments disclosed herein are exemplary, and should not be construed as being limiting in any way.

Figure 8E:
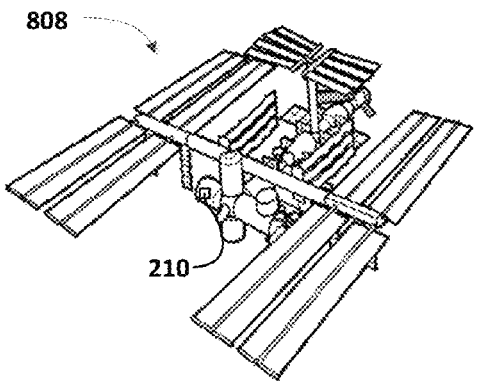

FIG. 8E illustrates a space station 808. It should be understood that the illustrated space station 808 is exemplary, and should not be construed as being limiting in any way. The space station 808 includes various structures for which accurate positioning may be desired. Exemplary structures include, but are not limited to, solar panels, locks, propulsion and attitude control systems, and the like. According to implementations, embodiments of the high aspect ratio positioning system 210 disclosed herein are employed in the space station 808 to control positioning of these and/or other structures. Additionally, or alternatively, one or more embodiments of the high aspect ratio positioning system 210 disclosed herein may be incorporated into an inertial measurement unit associated with the space station 808. Thus, output associated with one or more high aspect ratio positioning systems 210 can be used to monitor positioning and orientation of the space station 808.

Figure 8F:
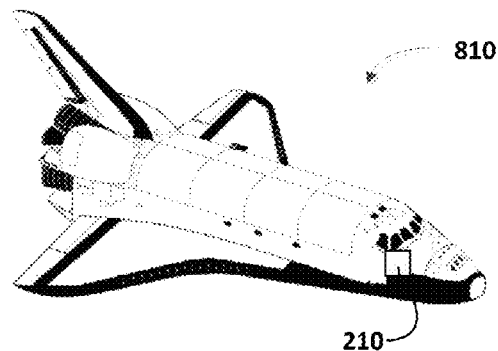

FIG. 8F illustrates a space shuttle 810, according to an exemplary embodiment. It should be understood that the illustrated space shuttle 810 is exemplary, and should not be construed as being limiting in any way. The space shuttle 810 includes various structures for which accurate positioning may be desired. Exemplary structures include, but are not limited to, elevons, landing gear, maneuvering engines, payload doors, thrust engines, rudders, other structures, and the like. According to implementations, embodiments of the high aspect ratio positioning system 210 disclosed herein are employed in the space shuttle 810 to control positioning of these and/or other structures. Additionally, or alternatively, one or more embodiments of the high aspect ratio positioning system 210 disclosed herein may be incorporated into an inertial measurement unit associated with the space shuttle 810. Thus, output associated with one or more high aspect ratio positioning systems 210 can be used to monitor positioning and orientation of the space shuttle 810.

While FIG. 8F illustrates a space shuttle 810, it should be understood that embodiments of the high aspect ratio positioning system 210 can be used in other spacecraft and/or other orbital vehicles in addition to, or instead of, the space shuttle 810. For example, embodiments of the high aspect ratio positioning system 210 can be employed in space probes, space telescopes, space vehicles, orbital vehicles and sub-orbital vehicles, reentry vehicles, lunar modules and vehicles, lunar orbiters, other spacecraft, combinations thereof, and the like. Thus, it should be understood that the embodiments disclosed herein are exemplary, and should not be construed as being limiting in any way.

Figure 8G:
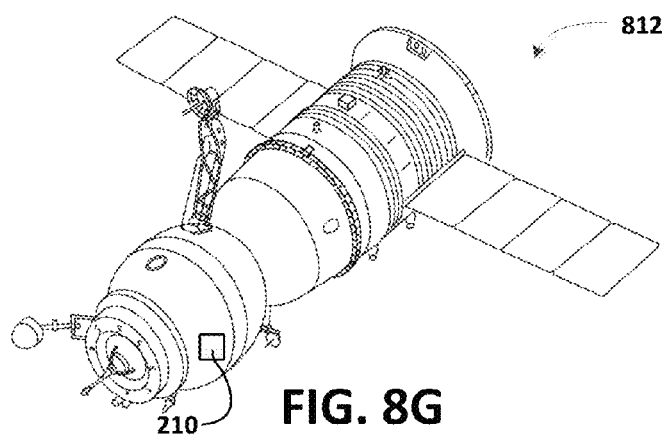

FIG. 8G illustrates a satellite 812, according to an exemplary embodiment. It should be understood that the illustrated satellite 812 is exemplary, and should not be construed as being limiting in any way. The satellite 812 includes various structures for which accurate positioning may be desired. Exemplary structures include, but are not limited to, solar panels, communication antennas, cameras, sensors, other structures, and the like. According to implementations, embodiments of the high aspect ratio positioning system 210 disclosed herein are employed in the satellite 812 to control positioning of these and/or other structures. Additionally, or alternatively, one or more embodiments of the high aspect ratio positioning system 210 disclosed herein may be incorporated into an inertial measurement unit associated with the satellite 812. Thus, output associated with one or more high aspect ratio positioning systems 210 can be used to monitor positioning and orientation of the satellite 812.

Although not illustrated in the FIGURES, it should be understood that additional embodiments are contemplated and are possible. For example, embodiments of the concepts and technologies disclosed herein can be embodied in additional or alternative operating environments including, but not limited to, military aircraft, private aircraft, helicopters, robotics, land vehicles, cruise missiles, interceptors, scramjets, handheld devices, automobiles, tanks, consumer electronics, and the like. Thus, it should be understood that the disclosed operating environments are exemplary, and should not be construed as being limiting in any way.

Figure 9:
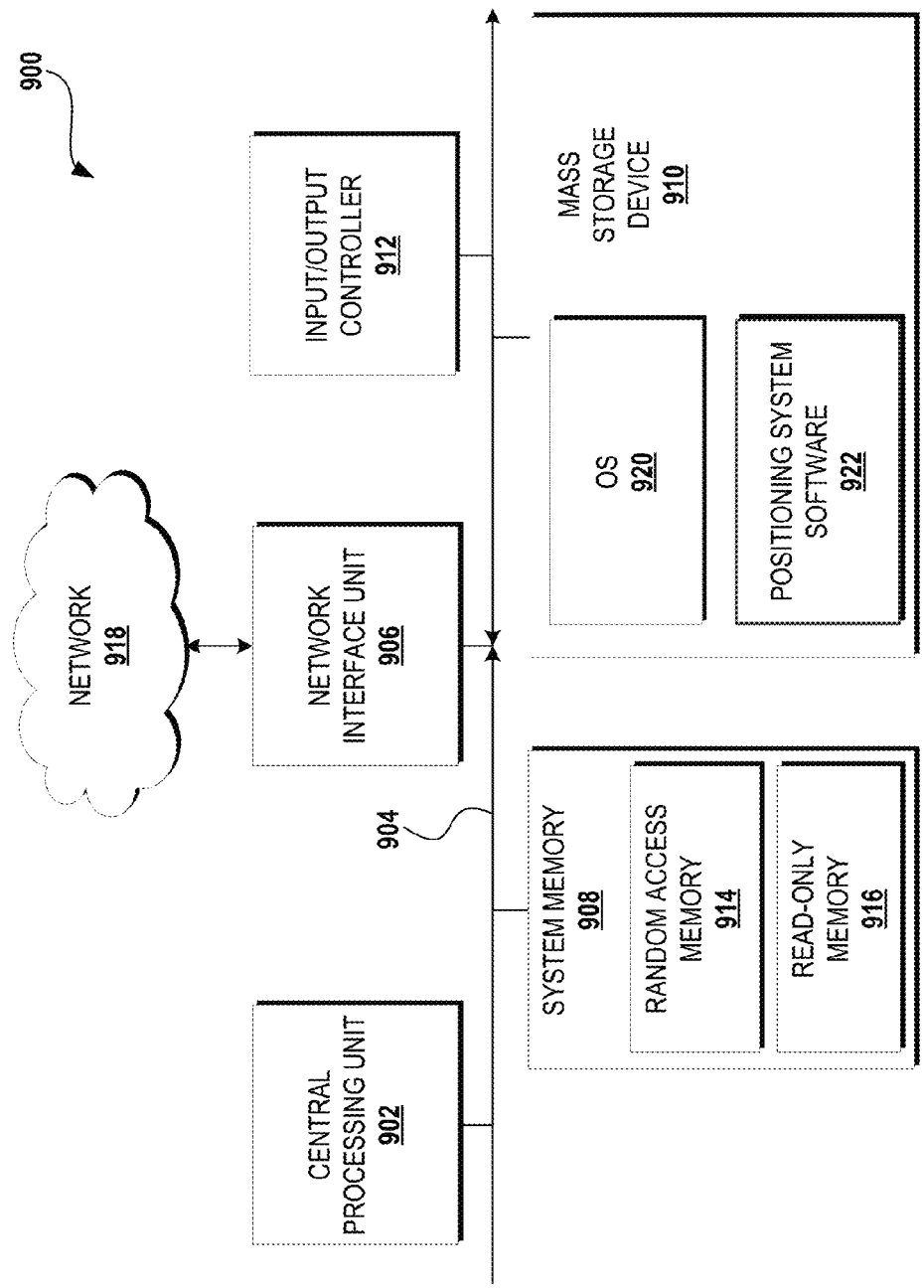
FIG. 9 shows an illustrative computer architecture of a computing device for tracking data generated by the high aspect ratio positioning system, according to an exemplary embodiment.

FIG. 9 shows an illustrative computer architecture 900 for a computing device capable of executing software for monitoring the high aspect ratio positioning system, as well as monitoring and tracking output associated with the high aspect ratio positioning system 210 described herein, as well as other software. The computer architecture 900 can correspond to a computer architecture of a personal computer, a tablet computer, a netbook computer, an onboard computing system, a processor associated with an inertial measurement unit or an inertial reference unit, combinations thereof, and the like. In some embodiments, the computer architecture 900 corresponds to an inertial measurement unit that can be installed in any number of devices or platforms including, but not limited to, the operating environments illustrated in FIGS. 9A-9G. The computer architecture 900 includes one or more central processing units 902 ("CPUs"), a system memory 908, including a random access memory 914 ("RAM") and a read-only memory 916 ("ROM"), and a system bus 904 that couples the memory to the CPUs 902.

The CPUs 902 may be standard programmable processors that perform arithmetic and logical operations necessary for the operation of the computer architecture 900. The CPUs 902 may perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The computer architecture 900 also includes a mass storage device 910. The mass storage device 910 may be connected to the CPUs 902 through a mass storage controller (not shown) further connected to the bus 904. The mass storage device 910 and its associated computer-readable media provide non-volatile storage for the computer architecture 900. The mass storage device 910 may store various software, application modules, and/or other program modules, such as an operating system 920 for controlling the operations of the computer architecture, as well as software for tracking and managing one or more high aspect ratio positioning systems 210 and/or other positioning and/or orientation systems ("positioning system software 922"). The mass storage device 910 also may store data collected or utilized by the various systems and modules.

The computer architecture 900 may store programs and data on the mass storage device 910 by transforming the physical state of the mass storage device to reflect the information being stored. The specific transformation of physical state may depend on various factors, in different implementations of this disclosure. Examples of such factors may include, but are not limited to, the technology used to implement the mass storage device 910, whether the mass storage device is characterized as primary or secondary storage, and the like. For example, the computer architecture 900 may store information to the mass storage device 910 by issuing instructions through the storage controller to alter the magnetic characteristics of a particular location within a magnetic disk drive device, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description, with the foregoing examples provided only to facilitate this description. The computer architecture 900 may further read information from the mass storage device 910 by detecting the physical states or characteristics of one or more particular locations within the mass storage device.

Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 900.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 900. For purposes the claims, the phrase "computer storage medium" and variations thereof, does not include waves, signals, and/or other transitory and/or intangible communication media, per se.

According to various embodiments, the computer architecture 900 may operate in a networked environment using logical connections to other systems or networks, for example, avionics systems in an aircraft, which may be accessed through a network 918. The computer architecture 900 may connect to the network 918 through a network interface unit 906 connected to the bus 904. It should be appreciated that the network interface unit 906 may also be utilized to connect to other types of networks and remote computer systems. The computer architecture 900 also may include an input-output controller 912 for receiving input and providing output.

Based on the foregoing, it should be appreciated that concepts and technologies for high aspect ratio positioning systems are provided herein. Although the subject matter presented herein has been described in language specific to computer structural features, methodological acts, and computer-readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A high aspect ratio positioning system comprising:
   a support surface;
   a motor having a circular configuration and disposed adjacent the support surface, the motor comprising
      a motor coil assembly attached to an outer magnetic layer that defines an outer diameter of the motor,
      a commutation coil assembly and a ring of magnets disposed adjacent an inner magnetic layer that defines an inside diameter of the motor; and
   two resolvers adjacent the motor, wherein a first of the two resolvers comprises a first coil having a first number of windings, and wherein a second of the two resolvers comprises a second coil having a second number of windings, the second number being one less than the first number.

2. The high aspect ratio positioning system of claim 1, wherein at least one of the outer magnetic layer and the inner magnetic layer are formed from ferritic steel.

3. The high aspect ratio positioning system of claim 1, further comprising a gap between the motor coil assembly and the commutation coil assembly.

4. The high aspect ratio positioning system of claim 1, wherein the ring of magnets comprises a ring of rare earth magnets.

5. The high aspect ratio positioning system of claim 4, wherein the ring of rare earth magnets are attached to the inner layer.

6. The high aspect ratio positioning system of claim 1, wherein at least one of the two resolvers comprises an inner resolver coil and an outer resolver coil.

7. The high aspect ratio positioning system of claim 6, wherein the inner resolver coil comprises a coil formed from a conductive material.

8. The high aspect ratio positioning system of claim 7, wherein the coil is encased in a flexible material.

9. The high aspect ratio positioning system of claim 8, wherein the flexible material comprises KAPTON.

10. The high aspect ratio positioning system of claim 7, wherein the outer resolver coil comprises two coils formed from the conductive material, and wherein the two coils are encased in a flexible material.

11. The high aspect ratio positioning system of claim 1, wherein the support surface comprises a spherical surface.

12. The high aspect ratio positioning system of claim 11, wherein the motor coil assembly and the two resolvers are disposed proximate to a largest diameter of the support surface.

13. The high aspect ratio positioning system of claim 12, wherein the largest diameter of the support surface is between four inches and six inches.

14. The high aspect ratio positioning system of claim 12, wherein the largest diameter of the support surface is between two inches and twelve inches.

15. An inertial measurement unit comprising:
   a set of spherical gimbals comprising an outer sphere and an innermost sphere, the innermost sphere comprising a support surface;
   a motor having a circular configuration and disposed adjacent the support surface, the motor comprising a motor coil assembly attached to an outer magnetic layer that defines an outer diameter of the motor, a commutation coil assembly, and a ring of magnets disposed adjacent an inner magnetic layer that defines an inside diameter of the motor; and
   two resolvers adjacent the motor, wherein a first of the two resolvers comprises a first coil having a first number of windings, and wherein a second of the two resolvers comprises a second coil having a second number of windings, the second number being one less than the first number.

16. The inertial measurement unit of claim 15, further comprising a gap between the motor coil assembly and the commutation coil assembly.

17. The inertial measurement unit of claim 15, wherein the ring of magnets comprises a plurality of rare earth magnets arranged in a ring, wherein the plurality of rare earth magnets are attached to the inner layer.

18. The inertial measurement unit of claim 15, wherein each of the two resolvers comprises an inner resolver coil and an outer resolver coil.

19. The inertial measurement unit of claim 18, wherein the outer resolver coil comprises two coils formed from a conductive material, each of the two coils being encased in a flexible material.

20. The inertial measurement unit of claim 18, wherein each of the inner resolver coils and the outer resolver coils comprises a coil formed from the conductive material.

21. The inertial measurement unit of claim 20, wherein each of the coils is encased in the flexible material.

22. The inertial measurement unit of claim 15, further comprising an interface for communicating with a computing system in communication with the inertial measurement unit.

23. The inertial measurement unit of claim 22, wherein the computing system comprises a system of an operating environment for the inertial measurement unit.

24. The inertial measurement unit of claim 23, wherein the operating environment comprises a vehicle.

25. The inertial measurement unit of claim 24, wherein the vehicle comprises an aircraft, and the computing system comprises an avionics system of the aircraft.

26. The inertial measurement unit of claim 24, wherein the vehicle comprises a watercraft.

27. The inertial measurement unit of claim 24, wherein the vehicle comprises a spacecraft.

28. A spherical gimbal set comprising:
   an outer sphere;
   an innermost sphere comprising a support surface; and
   a high aspect ratio positioning system disposed proximate to the support surface, the high aspect ratio positioning system comprising a motor having a circular configuration and disposed adjacent the support surface, the motor comprising a motor coil assembly attached to an outer magnetic layer that defines an outer diameter of the motor, a commutation coil assembly, and a ring of magnets disposed adjacent an inner magnetic layer that defines an inside diameter of the motor, and two resolvers adjacent the motor, wherein a first of the two resolvers comprises a first coil having a first number of windings, and wherein a second of the two resolvers comprises a second coil having a second number of windings, the second number being one less than the first number.

29. The spherical gimbal set of claim 28, wherein the outer sphere comprises two flanges configured to connect the outer sphere to a support such that the outer sphere is allowed to rotate about a rotational axis concentric with a center of the flanges.

30. The spherical gimbal set of claim 29, wherein the outer sphere further comprises two inner flanges configured to connect to two innermost flanges of an innermost sphere, the innermost sphere being supported by the outer sphere such that the innermost sphere is allowed to rotate about a second rotational axis.

31. The spherical gimbal set of claim 28, wherein the ring of magnets comprises a ring of rare earth magnets attached to the inner layer.

32. The spherical gimbal set of claim 28, wherein the first number of windings are formed from a conductive material and encased in a flexible material, and wherein the second number of windings are formed from the conductive material and encased in the flexible material.

33. The spherical gimbal set of claim 32, wherein the conductive material comprises copper, and the flexible material comprises KAPTON.

34. The spherical gimbal set of claim 28, wherein the innermost sphere is formed from aluminum.

35. A vehicle comprising an inertial measurement unit configured to track orientation of the vehicle, the inertial measurement unit comprising:
 a set of spherical gimbals comprising an innermost sphere, the innermost sphere comprising a support surface;
 a motor having a circular configuration and disposed adjacent the support surface, the motor comprising a motor coil assembly attached to an outer magnetic layer that defines an outer diameter of the motor, a commutation coil assembly, a gap between the motor coil assembly and the commutation coil assembly, and a plurality of magnets arranged in a ring, the magnets being disposed adjacent an inner magnetic layer that defines an inside diameter of the motor; and
 two resolvers adjacent the motor, wherein each of the two resolvers comprises an inner resolver coil and an outer resolver coil, wherein a first of the two resolvers comprises a first coil having a first number of windings, and wherein a second of the two resolvers comprises a second coil having a second number of windings, the second number being one less than the first number.

36. The vehicle of claim 35, wherein the first number of windings are formed from copper and encased in KAPTON, and wherein the second number of windings are formed from copper and encased in the KAPTON.

37. The vehicle of claim 36, wherein the vehicle further comprises a warhead and an engine for delivering the warhead.

38. A method for sensing movement of a structure, the method comprising:
 receiving a data signal generated by a high aspect ratio positioning system in response to movement of the structure;
 determining if movement of the structure has ceased; and
 in response to determining that movement of the structure has not ceased, monitoring the high aspect ratio positioning system for another data signal, wherein the high aspect ratio positioning system comprises:
  a support surface;
  a motor having a circular configuration and disposed adjacent the support surface, the motor comprising a motor coil assembly attached to an outer magnetic layer that defines an outer diameter of the motor, a commutation coil assembly, and a ring of magnets disposed adjacent an inner magnetic layer that defines an inside diameter of the motor; and
  two resolvers adjacent the motor, wherein a first of the two resolvers comprises a first coil having a first number of windings, and wherein a second of the two resolvers comprises a second coil having a second number of windings, the second number being one less than the first number.

39. The method of claim 38, wherein the data signal comprises data indicating movement of the resolvers.

40. The method of claim 38, wherein the positioning system comprises an inertial measurement unit.

\* \* \* \* \*